United States Patent [19]
Jaeger et al.

[11] Patent Number: 5,150,436
[45] Date of Patent: Sep. 22, 1992

[54] SLOW-WAVE ELECTRODE STRUCTURE

[75] Inventors: Nicolas A. F. Jaeger; Zachary K. F. Lee, both of Vancouver, Canada

[73] Assignee: The University of British Columbia, Canada

[21] Appl. No.: 756,300

[22] Filed: Sep. 6, 1991

[51] Int. Cl.⁵ ............................................... G02B 6/10
[52] U.S. Cl. ........................................... 385/2; 385/3
[58] Field of Search ............... 385/2, 3; 333/161, 204, 333/238, 246

[56] References Cited

U.S. PATENT DOCUMENTS

| | | | |
|---|---|---|---|
| 4,340,873 | 7/1987 | Bastida | 333/161 |
| 4,390,236 | 6/1983 | Alferness | 385/2 |
| 4,448,479 | 5/1984 | Alferness | 385/2 |
| 4,460,880 | 7/1984 | Turner | 333/238 |
| 4,714,311 | 12/1987 | Auracher | 385/2 |
| 4,914,407 | 4/1990 | Itoh | 333/161 |
| 4,928,076 | 5/1990 | Mourou et al. | 385/2 |
| 4,973,140 | 11/1990 | Cheo et al. | 385/2 |
| 5,004,313 | 4/1991 | Ty Tan et al. | 385/2 |
| 5,061,030 | 10/1991 | Miyamoto et al. | 385/3 |
| 5,076,655 | 12/1991 | Bridges | 385/3 |

*Primary Examiner*—Frank Gonzalez
*Attorney, Agent, or Firm*—C. A. Rowley

[57] ABSTRACT

A slow-wave electrode structure suitable for use in integrated optical modulators having a pair of spaced substantially parallel integrated optical waveguides in a compound semi-conductor substrate (such as gallium arsenide (GaAs) or indium phosphide (InP)) is formed by a pair of substantially parallel conductor strips on the surface of the substrate each in a position for interaction with its respective adjacent of said waveguides. The conductor strips are capacitively interconnected by narrow fins each integral with one of the strips and extending between the strips whereby the conducting strips and fins may be applied as a single layer to the substrate. The narrow fins significantly increase the capacitance per unit length between the strips without an equivalent decrease in inductance per unit length along the strips such that the phase velocity of the microwave signals is reduced.

21 Claims, 3 Drawing Sheets

SLOW-WAVE ELECTRODE STRUCTURE

FIELD OF THE INVENTION

The present invention relates to slow-wave electrode structures. More particularly the present invention relates to a slow-wave electrode structure for use in electro-optic modulators.

BACKGROUND OF THE PRESENT INVENTION

Broadband electro-optic waveguide modulators with low power consumption are necessary for optical communications and high speed signal processing. Compound semi-conductors (e.g. gallium arsenide (GaAs) or indium phosphide (InP)) provide suitable substrates for such communication components as they permit combining both optical and electronic devices using a single substrate. However, microwave loss and dispersion, as well as, inherent differences in phase and group velocites between the optical and microwave signals in a travelling wave modulator limit the available bandwidth.

Two electrode configurations for GaAs modulators are known. These include microstrip configurations using a p-i-n structure and coplanar strip electrode configurations using undoped epitaxial layers grown on a semi-insulating GaAs substrate.

The overlap between the optical and microwave fields in the p-i-n modulators is close to perfect, however the use of n+ GaAs substrates in the p-i-n causes high microwave losses and dispersion which as a result limit the achievable bandwidth.

Modulators having coplanar strip electrodes fabricated on semiinsulating compound semi-conductor substrates (e.g. gallium arsenide (GaAs)) on the other hand, suffer very little microwave loss and dispersion but unfortunately the velocity mismatch between the optical and microwave signals causes the power consumption to increase with increasing frequency.

U.S. Pat. No. 4,340,873 issued Jul. 20, 1982 to Bastida discloses a periodic transmission structure for slow-wave signals constructed by depositing two spaced parallel conducting bands on a semi-insulating semiconductor substrate such as gallium arsenide (GaAs). These bands are interconnected by spaced transverse conductors (spaced by a distance less than the wavelength of the microwave signals being transmitted) and central longitudinal conducting strip traversing the transverse conductor strips and separated therefrom by a dielectric film interposed therebetween to provide a succession of concentrated capacitances that slow the signal.

U.S. Pat. No. 4,460,880 issued Jul. 17, 1984 provides circuit matching elements primarily for integrated circuits using a layered structure adapted to increase the specific capacitance of the line without decreasing the specific inductance to slow the signal and thus decrease the wavelength of the signals.

U.S. Pat. No. 4,914,407 discloses a slow-wave structure for monolithic microwave circuits incorporating spaced parallel waveguides on a semiconductor substrate and using a multi-layered ladder like structure including conducting bands parallel to the waveguides and a plurality of cross-tie like conductors separated therefrom by a dielectric layer to provide space capacitances at each cross-tie element to change the capacitance of the system and thereby slow the signal. This system obviously requires that the conductor strips and cross-tie elements be deposited as separate layers with a dielectric layer deposited therebetween, making the structure costly to produce.

BRIEF DESCRIPTION OF THE PRESENT INVENTION

It is an objective of the present invention to provide a slow-wave electrode structure particularly suited for use in compound semi-conductor electro-optic waveguide modulators to permit reduction in power requirements and matching of velocities. The structure also permits the conducting elements to be deposited on the substrate as a single layer thereby permitting cost reductions.

Broadly the present invention relates to a slow-wave electrode structure suitable for modulating a signal for a pair of substantially parallel optical waveguides integrated in a substrate, said structure comprising a pair of substantially parallel conductor strips substantially parallel with said waveguides and with each of said strips in an interactive relationship with its respective adjacent of said waveguides, a plurality of narrow fin means substantially coplanar with and extending transversely across a gap separating said conductor strips without interconnecting said strips, said fin means being spaced apart longitudinally of said strips by a distance significantly less than the wavelength of said signal and forming a capacitance connection between said strips that increases the capacitance per unit length between said strips without an equivalent decrease in inductance per unit length along said strips so that the phase (and group) velocity of microwave signals carried by said strips is reduced.

Preferably said substrate will be a suitable compound semi-conductor.

Preferably said compound semi-conductor will be gallium arsenide (GaAs) or indium phosphide (InP) based compound semi-conductor.

Preferably said fin means extend substantially from one of said strips and terminate adjacent the other of said strips.

More preferably fin means will extend from each of said strips and even more preferably each fin means will be composed of a pair of fin elements extending one from each of said strips, each said pair of elements cooperating with its other element of its respective pair of elements and terminating in spaced relationship therewith to define a capacitance area therebetween.

Preferably said fin means will have their major axes substantially perpendicular to the longitudinal axes of said strips.

The capacitance area between a pair of fin elements may have its major axis substantially parallel to the major axis of said fin elements or preferably substantially perpendicular to said major axis of said fin elements and said major axes of said pair of fin elements will be substantially in axial alignment.

In a coplanar waveguide system an intermediate conductor strip will be interposed between said pair of conductor strips and will be capacitively interconnected with each of said conductor strips of said pair of conductor strips by said fin means.

Preferably said intermediate conductor strip will be provided with further fins adapted to cooperate with said fin means to capacitively interconnect said intermediate strip with each of said pair of strips.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
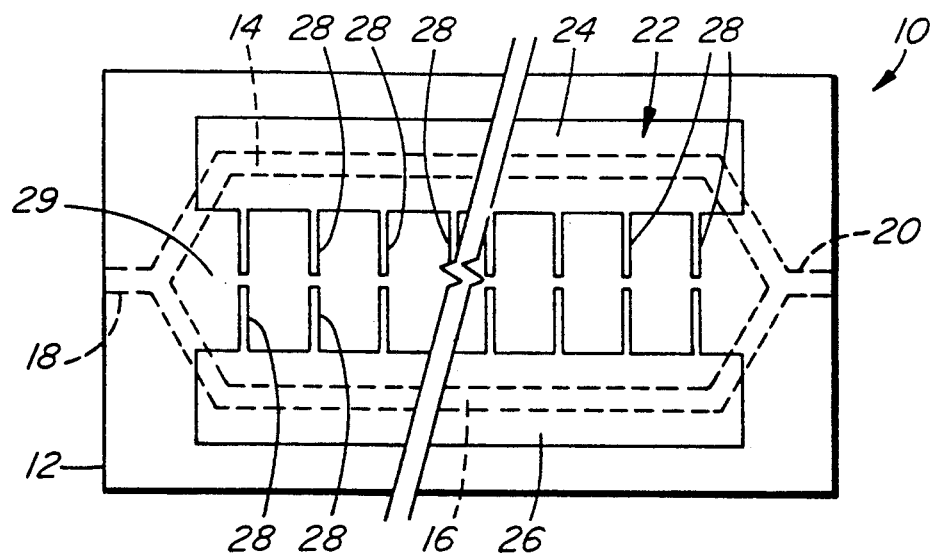
FIG. 1 is a schematic plan view of a slow-wave electro-optic modulator incorporating a slow-wave electrode structure constructed in accordance with the present invention.

As shown in FIG. 1 the slow-wave electro-optic waveguide modulator 10 of the present invention is composed of a substrate 12 formed of a suitable compound semi-conductor material (e.g. of gallium arsenide (GaAs) or indium phosphide (InP)) having integrated substantially parallel optical waveguides 14 and 16 diverging from an incoming waveguide 18 and converging to an out-flowing waveguide 20 as illustrated both via the dotted line in FIG. 1.

Superimposed over the waveguides 14 and 16 is a slow-wave electrode structure 22 incorporating the present invention and composed of a pair of coplanar strip electrodes 24 and 26 separated by a space 29 and periodically loaded with capacitive elements in the form of spaced fins 28 extending across the space or gap 29 without conductively interconnecting the strips 24 and 26. These fins 28 are substantially coplanar with and preferably are provided substantially along the full length of the modulating region (i.e. the length of the strip wherein the electric signal interacts with the optical waveguide to modulate the optical signal) of the strip electrodes or conductors 24 and 26. The velocity of the microwave travelling along the electrode can be engineered by predefining the capacitance and periodicity, i.e. spacing and length (measured parallel to the length of the strips 24 and 26) of the fins 28 to permit achieving a velocity-matched condition and a modulator capable of wide bandwidth and low modulating power as will be described in more detail hereinbelow.

Figure 2:
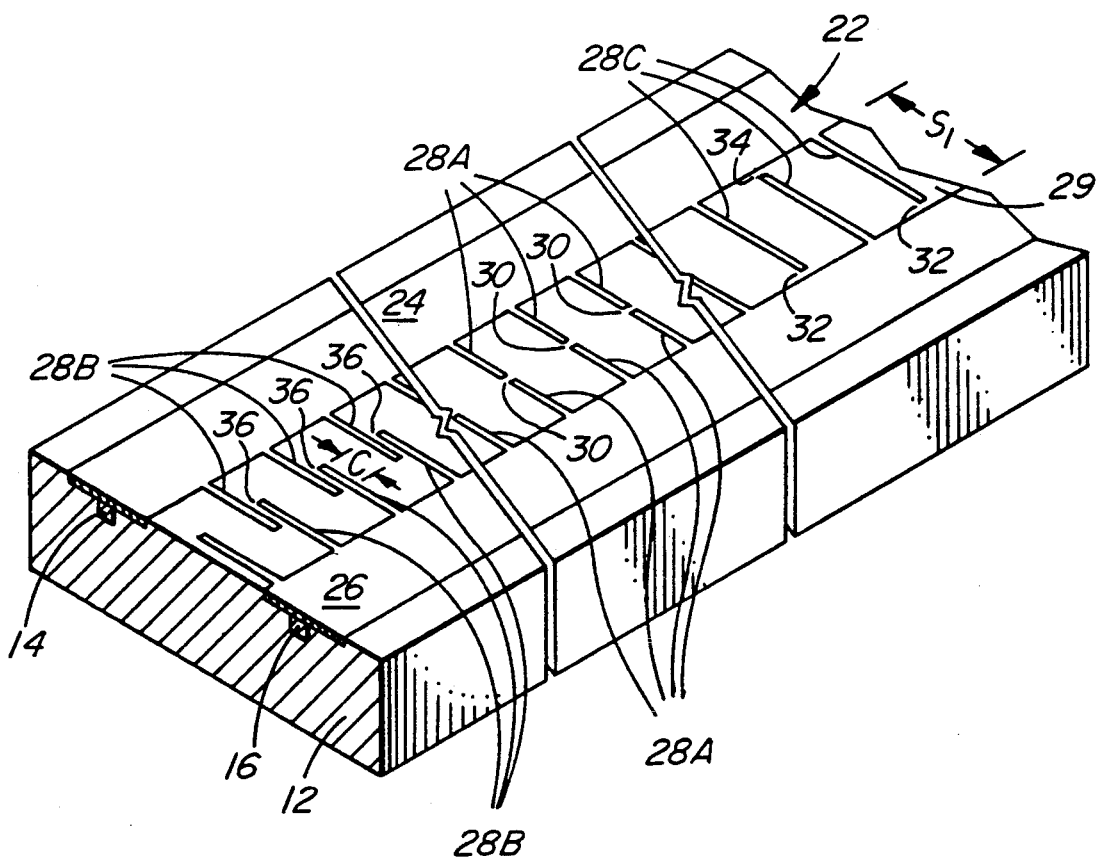
FIG. 2 is a significantly enlarged isometric view of a slow-wave electro-optic waveguide modulator incorporating the present invention.
Figure 4:
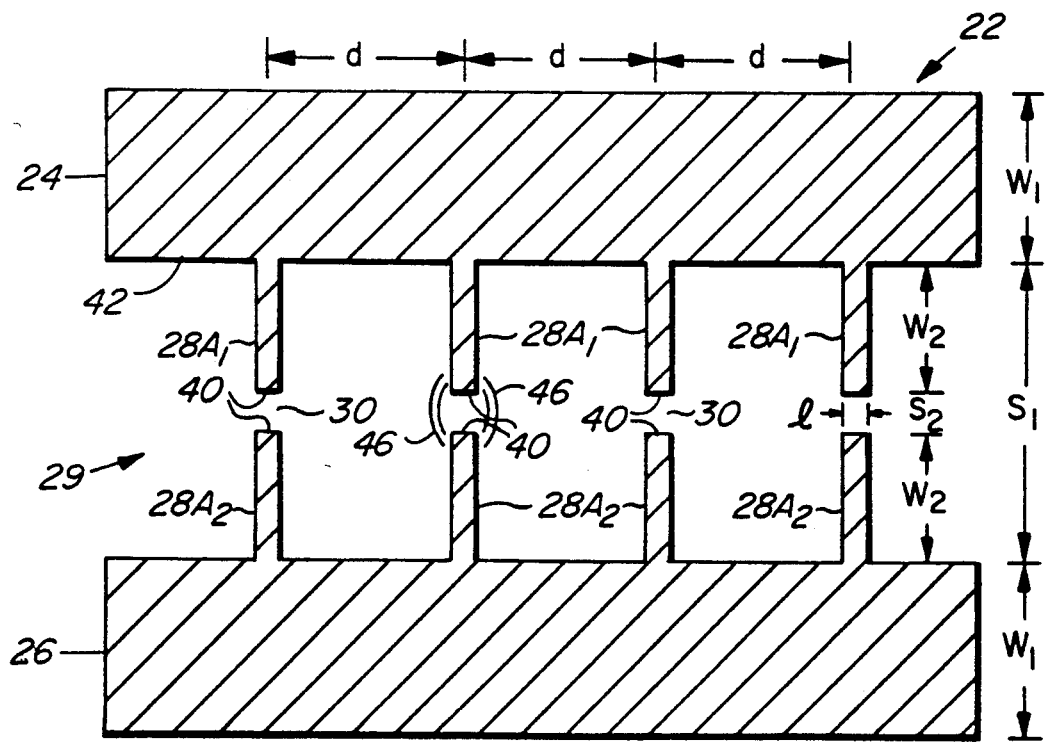
FIG. 4 is an enlarged plan view of an electrode structure constructed in accordance with the present invention.
Figure 5:
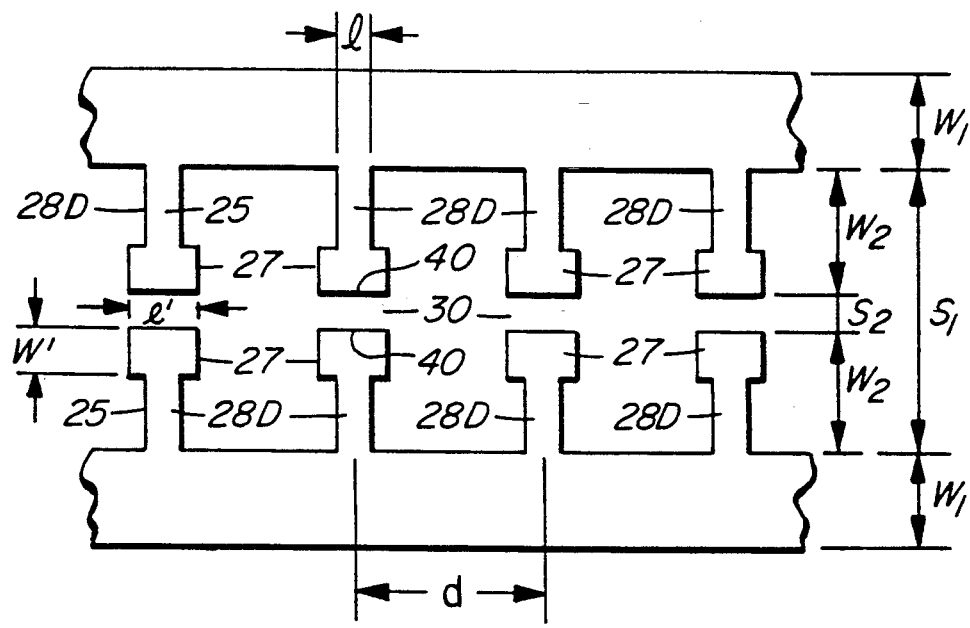
FIG. 5 is a plan view of a segment of a preferred form of electrode structure constructed in accordance with the present invention.

As shown in FIG. 2 the fins 28 may take a variety of different forms, three of which are illustrated by fins 28A, 28B and 28C and a preferred arrangement as shown in FIG. 5. The arrangement of fins 28A incorporates substantially pairs of fin elements $28A_1$ and $28A_2$ (see FIG. 4), one element extending from each of the conductors or electrodes 24 and 26 respectively and terminating in spaced end to end relationship to define a capacitance space or gap 30 having its major axis substantially perpendicular to the major axis of the fins 28A.

The fins 28C extend substantially across the gap 29 between the conductors 24 and 26. In the arrangement illustrated in FIG. 2 each of the alternate fins 28C extend from alternate sides of the gap 29 and terminate adjacent the opposite conductor (24 or 26), for example the fin 28C on the left extends from conductor or electrode 24 substantially completely across the gap 29 to the conductor 26 to provide a capacitive gap 32 therebetween while the middle fin 28C extends from the conductor 26 to terminate just short of the conductor 24 to provide a capacitive gap 34 between the end of the fin 28C and the adjacent edge of the electrode 24. In this arrangement as with the preferred arrangement the gap 32 and 34 are substantially perpendicular to the major axis of the fin 28C.

The fins 28B overlap in the gap 29 and define an overlap capacitive gap 36 therebetween. The major axis of this gap 36 is indicated by the dimension c. In this arrangement the capacitance gap 36 extends substantially parallel to the major axes of the fins 28B.

The preferred arrangement is shown in FIG. 5 and provides pads 27 at the ends of each of the fins 28D (the fins 28D are essentially the same as fins 28A but are provided with pads 27 that define the adjacent or facing ends of the fins 28D). These pads 27 have a length $l'$ measured parallel to the longitudinal axis of the strips 24 and 26 i.e. parallel to the length dimensions l and d and have a width $W'$ measured along the major axis of the fins 28D (i.e. parallel to the widths $W_1$, $W_2$, $S_1$ and $S_2$ indicated in FIGS. 4 and 5 and to be described below).

Generally the dimensions d and l will be very small on the order of micrometers ($\mu$m) and the ratio of l to d will normally be less than $\frac{1}{2}$ and more preferably less than $\frac{1}{4}$. Normally $W_2$ will be at least 3 l and preferably will be at least 5 l. As will be apparent the values for t, $W_1$, $S_1$, etc. will be such as is required to form the desired system in accordance with the conventional practice for the electro-optic system in which the invention is employed and will be relatively small i.e. generally measured in micrometers although the width $W_1$ may well be millimeters or portions of millimeters e.g. 0.1 mm.

The dimension $S_2$ ensures that the fins operate as a capacitive means and the dimension l (length of the fins 28 measured perpendicular to the major axis of the fins 28 i.e. parallel to the longitudinal axes of the strips 24 and 26) is small to limit current flow including flow parallel to the strips 24 and 26.

It will be apparent that in all the above structures the fins 28 and the strips 24 and 26 are substantially coplanar and thus may be deposited as a single layer which is patterned into the desired structure for example, using the appropriate combination of photo or e-beam lithography and lift-off or chemical etching techniques. The fins 28 and conductors strips 24 and 26 may be applied on the surface of the compound semi-conductor substrate 12 or may be partially embedded (normally to a uniform depth) in the surface of the substrate 12.

Figure 3:
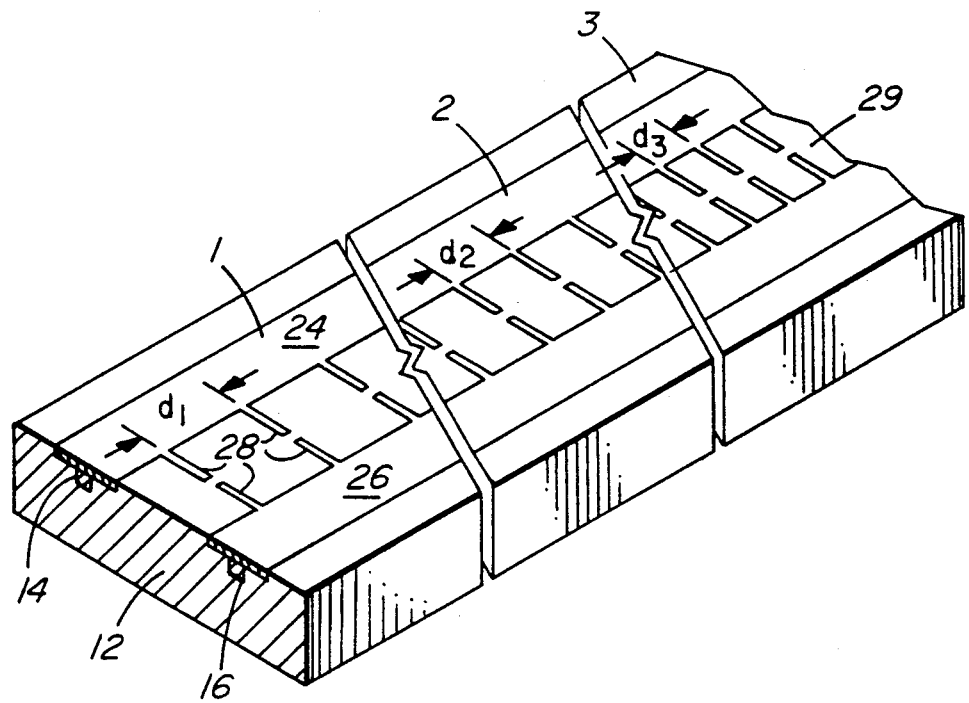
FIG. 3 is a view similar to FIG. 2 showing a modified arrangement of fins to change the signal velocity in stages.

The spacing d (see FIGS. 3, 4 and 5) between adjacent fins 28 as above indicated plays a significant role in the slowing of the microwaves thus as the spacing is changed the microwave velocity is also changed, i.e., the smaller the gap or distance d the slower the microwaves. The sections indicated at 1, 2 and 3 reduce the velocity in accordance with the spacings $d_1$, $d_2$ and $d_3$ respectively until the desired speed is attained and then a constant spacing between the fins 28 will be maintained (see FIG. 3). Normally such stepping is not required.

As above indicated, the engineering of the electrode to attain the required matching of velocity is done by proper design of the electrode structure 22 as will be explained in more detail when referring to FIG. 4. As shown in FIG. 4 the electrode structure 22 has a first electrode strip 24 and a second electrode or conductor strip 26 with fins 28A projecting into the gap 29 between the two electrode strips 24 and 26. The longitudinal spacing between the fins 28A along the strips 24 and 26 is indicated by the dimension d and will always be significantly less than the wavelength of the signal being modulated. The gap 29 has a width dimension $S_1$, the widths of the conductor strips 24 and 26 are each equal to $W_1$. In the FIG. 4 embodiment each of the fin elements $28A_1$ and $28A_2$ project from the conductor strips 24 and 26 respectively substantially the same distance (measured in the width direction of the strips 24 and 26) as indicated by the dimension $W_2$ and have their ends 40 separated to provide a gap 30 having a spacing $S_2$. The elements $28A_1$ and $28A_2$ of each of the pairs of elements forming the fins 28A are co-axial i.e. in the illustrated arrangement their major axes are co-axial. This gap 30 in the illustrated arrangement, is centred between the adjacent edges 42 and 44 of the conductor strips 24 and 26 and has a length measured in the longitudinal direction of the strips 24 and 26 (i.e. perpendicular to the major axis of the fins $28A_1$ and $28A_2$) as indicated by the dimension l which in the FIG. 4 embodiment is equivalent to the length of the fin 28A.

Generally each of the gaps 30 will have a capacitance between the faces 40 and a fringe capacitance as indicated by the schematic lines 46 (and on the top and bottom as well) on each of the pairs of co-axial fins 28A in FIG. 4. These fringing capacitances enhance the slowing of the microwaves by changing the capacitance per unit length of the system without a corresponding change in the inductance per unit length so that slowing of the microwaves occurs.

The preferred arrangement is shown in FIG. 5 and provides pads 27 at the free ends of the fins 28D (fins 28D are essentially the same as the fins 28A, but are provided with pads 27 that define the adjacent or facing ends of the fins 28D). The pads 27 have a length l' measured parallel to the dimension l and d and have a width W' measured parallel to the widths $W_1$, $W_2$, $S_1$ and $S_2$.

It is believed that the present invention operates on the following theory.

The phase and group velocities of the microwaves travelling along coplanar conducting strips are equal and constant regardless of the physical dimensions of the strips if one ignores microwave loss and material dispersion since any change in strip dimensions to increase the shunt capacitance C per unit length always corresponds to a decrease in the series inductance L per unit length along the strip. The net effect is that the phase (and group) velocity $v_p = (LC)^{-\frac{1}{2}}$ remains constant. If additional capacitances $C_f$ in the form of the narrow fins 28 are added to the strips at periodic intervals then L will only be minusculy (not be significantly) affected and the slowing down of the microwave results due to a significant increase in effective capacitance per unit length. It can be shown that if the spacing or period d of the fins 28 is significantly smaller than the wavelength of the microwave then the effective capacitance per unit length is simply $(C + C_f/d)$ so that the phase velocity of the microwaves to a good approximation can be written as $$v_p = [L(C + C_f/d)]^{-\frac{1}{2}}$$

where
$v_p$ = phase velocity;
L = inductance/unit length
C = capacitance/unit length
$C_f/d$ = additional capacitance/unit length due to the fins
d = spacing as shown in FIGS. 4 or 5

At frequencies below several hundred gigahertz the group velocity is constant and is identical to the phase velocity.

The use of narrow fins is essential since the fringe electric field produced by a narrow fin (i.e. relatively small fin length l) increases the capacitance of the fin to a few times the capacitance predicted by simply multiplying the fin length l by the capacitance per unit length associated with two long coplanar strips while the change in inductance due to the fin is negligible. In other words, the narrower the fin is, the closer the fin is to a purely capacitive element.

The use of the pads 27 further increases the capacitance of the fin 28D while the change in inductance remains substantially negligible. To obtain the effects of the pad 27 the width W' must be sufficient to produce significant capacitance but not so large as to eliminate or materially reduce the effectiveness of the narrow portion 28 (i.e. essentially the same as length l) of the fin 28D in limiting current flow.

A relatively high dielectric constant superstrate (not shown) may be applied as it may help slow down the microwaves so that period of the fins may be increased while maintaining the same degree of retardation of the microwave velocity and thereby to minimize unwanted interactions between neighbouring fins. Furthermore the use of high dielectric constant superstrates allows one to use a wider coplanar strip electrode (24 and 26) due to the higher C and may facilitate matching the electrode to transmission lines having a 50 or 75 ohm characteristic impedance. It is also possible to fine tune the modulator by properly selecting the superstrate.

The capacitance of the fins is determined on the basis of the spacing d, gap width $S_1$, fin gap $S_2$, fin width $W_2$, conductor strip width $W_1$, fin length l or l' and fin (and strip conductor) thickness t (see FIG. 2) together with the dielectric constant of the substrate (for GaAs it is about 13) and that of the superstrate (the dimension t is a dimension perpendicular to the dimensions $S_1$ and d in FIG. 4 and designates the thickness of the coplanar strips 24, 26 and fins 28.

Table 1 shows the effectiveness of different forms of the present invention applied in a system having a t = 1.1 μm; l = 4 μm; $S_1$ = 60 μm; $S_2$ = 4 μm; $W_2$ = 28 μm.

TABLE 1

| | $W_1$ | W' | l' | d | $N_{eff}$ Surface | $N_{eff}$ Half Buried |
|---|---|---|---|---|---|---|
| #1 | 72 μm | (fins only) | 4 μm (fins only) | 18 μm | 3.33 | 3.37 |
| #2 | 110 μm | (fins only) | 4 μm (fins only) | 32 μm | 3.04 | 3.09 |
| #3 | 110 μm | 14 μm | 8 μm | 32 μm | 3.22 | 3.25 |
| #4 | 110 μm | 14 μm | 12 μm | 32 μm | 3.33 | 3.34 |
| #5 | 110 μm | 14 μm | 16 μm | 32 μm | 3.45 | 3.43 |
| #6 | 110 μm | 7 μm | 8 μm | 32 μm | 3.21 | 3.23 |
| #7 | 110 μm | 7 μm | 12 μm | 32 μm | 3.26 | 3.30 |

TABLE 1-continued

| | $W_1$ | W' | l' | d | $N_{eff}$ Surface | $N_{eff}$ Half Buried |
|---|---|---|---|---|---|---|
| #8 | 110 μm | 7 μm | 16 μm | 32 μm | 3.36 | 3.37 | where
$N_{eff}$ = effective refractive index of the microwave
Surface = conducting strips (and fins) on the surface of the semi-conductor
Half Buried = conducting strips (and fins) partially embedded in the semi-conductor In the above Table the values of $N_{eff}$ are believed to have a significance to 0.05.

When fins as shown in FIG. 4 are used (no pads 27) the change in $W_1$ from 72 μm to 110 μm and change in spacing, i.e. d=18 μm to d=32 μm shows a significant decrease in $N_{eff}$ (see examples #1 and 2).

When pads 27 (as shown in FIG. 5) are used $N_{eff}$ is significantly improved with $W_1$ equal to 110 μm to approach and in some cases surpass $N_{eff}$ for test #1 ($W_1$=72 μm) see tests #3 to 6. It will be apparent if l' is small $N_{eff}$ may not be influenced significantly by changing W' (see examples #3 and #6), however with larger pads e.g. l'=12 or 16 μm increasing the W' also changes the effectiveness of the system (compare examples #4 and 7 or 5 and 8).

The commercial device may have overall dimensions smaller than those used in the examples tested.

It will be apparent that the manufacture of a slow-wave electrode structure in accordance with the present invention may be easily done using a single deposition and pattern the conductors, for example using photo or e-beam lithography and lift off or chemical etching so that the modulators of the present invention may be easily and economically produced.

The widths of the strips 24 and 26 have been indicated as both equal to $W_1$, however it will be apparent that with appropriate design changes the widths of these strips need not be equal, similarly, as indicated above, the dimensions $W_2$ for the fins from both strips 24 and 26 need not be equal.

Figure 6:
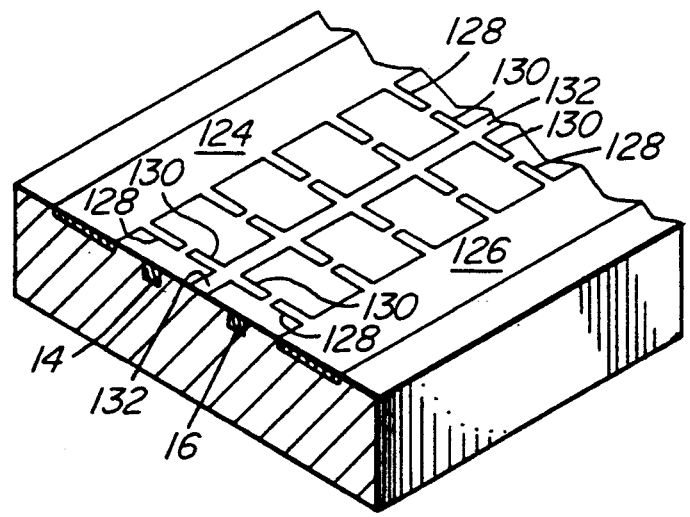
FIG. 6 is a view similar to FIG. 2 showing how the invention might be applied to a coplanar waveguide.

The above description has described the invention as applied to a coplanar strip system, it is believed, with suitable modification it may also be applied to coplanar waveguide systems as shown in FIG. 6 wherein cooperating fins 128 extend from the conductor strips 124 and 126 and cooperate capacitively with the fins 130 extending from the central conductor strip 132.

It is believed the present invention with suitable modification may also be applied to microwave transmission line structures.

Having described the invention, modifications will be evident to those skilled in the art without departing from the spirit of the invention as defined in the appended claims.

We claim:

1. A slow-wave electrode structure suitable for modulating a signal for a pair of spaced substantially parallel optical waveguides integrated in a substrate, said structure comprising a pair of substantially parallel conductor strips on a surface of said substrate and with each of said strips in interactive relationship with its respective adjacent of said waveguides, a plurality of narrow fin means substantially coplanar with and extending transversely across a gap separating said conductor strips without connecting said strips, said fin means being spaced apart longitudinally of said strips by a distance significantly less than the wavelength of said signal and forming a capacitance connection between said strips, said fin means being dimensioned so as to increase the capacitance per unit length between said strips without an equivalent decrease in inductance per unit length along said strips so that the phase velocity of a signal carried by said strips is reduced.

2. A slow-wave electrode structure as defined in claim 1 wherein said substrate is a compound semi-conductor material.

3. A slow-wave electrode structure as defined in claim 2 wherein said fin means comprises a plurality of discrete fins each integrally connected at one end to one of said strips and extending and terminate adjacent the other of said strips.

4. A slow-wave electrode structure as defined in claim 2 wherein said fin means comprises a plurality of discrete fins each integral with and extending from one of said strips.

5. A slow-wave electrode structure as defined in claim 4 wherein each said fin comprises a pair of fin elements extending one from each of said strips, each fin element of each said pair of fin elements forming a fin terminating in spaced relationship a fin element with which it forms a fin to define a capacitance area therebetween.

6. A slow-wave electrode structure as defined in claim 5 wherein the major axes of said fin elements are substantially perpendicular to the longitudinal axes of said strips.

7. A slow-wave electrode structure as defined in claim 6 wherein said capacitance areas have their major axes substantially parallel to the major axes of said fin elements.

8. A slow-wave electrode structure as defined in claim 6 wherein said capacitance areas have their major axes substantially perpendicular to said major axes of said fin elements and said major axes of said pair of fin elements defining each said fin means are substantially co-axial.

9. A slow-wave electrode structure as defined in claim 5 wherein each said fin element terminates in a pad dimensioned to further increase the capacitance per unit length between the strips without an equivalent decrease in inductance per unit length along the strips so that said phase velocity of said signal is further reduced.

10. A slow-wave electrode structure as defined in claim 6 wherein each said fin element terminates in a pad dimensioned to further increase the capacitance per unit length between the strips without an equivalent decrease in inductance per unit length along the strips so that said phase velocity of said signal is further reduced.

11. A slow-wave electrode structure as defined in claim 8 wherein each said fin element terminates in a pad dimensioned to further increase the capacitance per unit length between the strips without an equivalent decrease in inductance per unit length along the strips so that said phase velocity of said signal is further reduced.

12. A slow wave electrode structure as defined in claim 1 further comprising an intermediate conductor strip interposed between said pair of conductor strips and capacitively interconnected with each of said conductor strips of said pair of conductor strips by said fin means.

13. A slow wave electrode structure as defined in claim 12 wherein said intermediate conductor strip is provided with further fin means adapted to cooperate with said fin means to capacitively interconnect said intermediate strip with each of said pair of strips.

14. A slow-wave electrode structure as defined in claim 5 wherein said capacitance areas have their major axes substantially parallel to the major axes of said fin elements.

15. A slow-wave electrode structure as defined in claim 2 wherein said conductor strips and said fin means are partially embedded in said substrate.

16. A slow-wave electrode structure as defined in claim 5 wherein said conductor strips and said fin means are partially embedded in said substrate.

17. A slow-wave electrode structure as defined in claim 6 wherein said conductor strips and said fin means are partially embedded in said substrate.

18. A slow-wave electrode structure as defined in claim 8 wherein said conductor strips and said fin means are partially embedded in said substrate.

19. A slow-wave electrode structure as defined in claim 9 wherein said conductor strips and said fin means are partially embedded in said substrate.

20. A slow-wave electrode structure as defined in claim 10 wherein said conductor strips and said fin means are partially embedded in said substrate.

21. A slow-wave electrode structure as defined in claim 11 wherein said conductor strips and said fin means are partially embedded in said substrate.

* * * * *